United States Patent
Smith et al.

(10) Patent No.: US 7,111,764 B2
(45) Date of Patent: Sep. 26, 2006

(54) CLAMP ASSEMBLY FOR SECURING A LADDER TO A VEHICLE RACK

(75) Inventors: Robert F. Smith, Pageland, SC (US); Michael S. Richardson, Waxhaw, NC (US)

(73) Assignee: Nordman Corporation of NC, Waxhaw, NC (US)

( * ) Notice: Subject to any disclaimer, the term of this patent is extended or adjusted under 35 U.S.C. 154(b) by 312 days.

(21) Appl. No.: 10/706,558

(22) Filed: Nov. 11, 2003

(65) Prior Publication Data
US 2005/0098595 A1    May 12, 2005

(51) Int. Cl.
*B60R 9/048* (2006.01)
*E06C 5/00* (2006.01)

(52) U.S. Cl. ............ 224/319; 224/315; 224/536; 182/127; 70/19

(58) Field of Classification Search ............ 224/319, 224/315, 324, 321, 323, 330, 331, 515, 536; 182/205; 248/553, 316.4, 229.22, 229.12, 248/228.3, 503, 552; 70/14, 18, 19, 58, 226
See application file for complete search history.

(56) References Cited

U.S. PATENT DOCUMENTS

| | | | | |
|---|---|---|---|---|
| 63,468 | A * | 4/1867 | Card ........................ | 269/90 |
| 909,469 | A * | 1/1909 | Solberg ..................... | 144/307 |
| 2,134,823 | A * | 11/1938 | Stephan et al. ........... | 248/509 |
| 3,601,295 | A * | 8/1971 | Lowe ........................ | 224/42.38 |
| 4,413,801 | A * | 11/1983 | Lancaster et al. ......... | 248/316.4 |
| 4,827,742 | A * | 5/1989 | McDonald ................. | 70/19 |
| 5,020,342 | A * | 6/1991 | Doan et al. ................ | 70/14 |
| 5,076,531 | A * | 12/1991 | Delaney ..................... | 248/552 |
| 5,154,258 | A * | 10/1992 | Krukow ..................... | 182/127 |
| 5,186,588 | A * | 2/1993 | Sutton et al. .............. | 410/120 |
| 5,284,036 | A * | 2/1994 | Rosenbaum ................ | 70/14 |
| 5,357,654 | A * | 10/1994 | Hsing-Chi .................. | 24/68 B |
| 5,503,212 | A * | 4/1996 | Lin ............................ | 160/370.22 |
| 5,685,732 | A * | 11/1997 | Lane .......................... | 439/369 |
| 5,695,164 | A * | 12/1997 | Hartmann et al. ......... | 248/316.4 |
| 5,713,440 | A * | 2/1998 | Chen ......................... | 190/115 |

(Continued)

OTHER PUBLICATIONS

"Lockable Ladder Clamps"; Australian Reg. Design No. 135398; Entire article; Secure™ a Ladder; securealadder.com; published prior to Nov. 11, 2003.

(Continued)

*Primary Examiner*—Nathan J. Newhouse
*Assistant Examiner*—Justin M. Larson
(74) *Attorney, Agent, or Firm*—Schwartz Law Firm, P.C.

(57) ABSTRACT

A clamp assembly secures a first article to a second article. The clamp assembly includes first and second spaced-apart article holders adapted for engaging respective first and second articles. An elongated gear rack interconnects the first and second article holders. A pinion operatively engages the gear rack, and is adapted for moving the first article holder along the gear rack relative to the second article holder. A locking bar has a plurality of spaced teeth adapted for meshing with respective teeth of the gear rack in a locked position. The locking bar is moveable between the locked position and a released position. In the locked position, the meshing teeth of the locking bar and gear rack cooperate to prevent linear movement of the first article holder relative to the second article holder, thereby securing the first article to the second article. In the released position, the teeth of the locking bar and gear rack are sufficiently disengaged to allow free linear movement of the first article holder along the gear rack relative to the second article holder.

9 Claims, 7 Drawing Sheets

U.S. PATENT DOCUMENTS

| | | | |
|---|---|---|---|
| 5,769,292 A * | 6/1998 | Cucheran et al. | 224/324 |
| 5,865,044 A * | 2/1999 | Wu | 70/209 |
| 5,918,488 A * | 7/1999 | Deeter | 70/14 |
| 5,927,109 A * | 7/1999 | Sieck | 70/58 |
| 5,996,736 A * | 12/1999 | Stankiewicz | 182/127 |
| 6,397,644 B1 * | 6/2002 | Gidding | 70/18 |
| 6,408,984 B1 | 6/2002 | Cavagnaro | |
| 6,523,730 B1 * | 2/2003 | Anderson | 224/324 |
| 6,539,758 B1 * | 4/2003 | Meekma et al. | 70/209 |
| 6,688,428 B1 * | 2/2004 | Carroll, Jr. | 182/127 |
| 6,736,300 B1 * | 5/2004 | Deakin | 224/319 |
| 2005/0061583 A1 * | 3/2005 | Stevens | 182/127 |

OTHER PUBLICATIONS

"Hook-Um Dano Ladder Locks"; Web Site Adertisement; Entire article; Hook-Um Dano Ladder Locks™; hookumdano.com; Copyright 1999-2003.

* cited by examiner

CLAMP ASSEMBLY FOR SECURING A LADDER TO A VEHICLE RACK

TECHNICAL FIELD AND BACKGROUND OF THE INVENTION

This invention relates generally to a clamp assembly, and more specifically to a clamp assembly designed and adapted for securing a ladder or other loose article to a vehicle rack. The invention is quickly and conveniently applied, and offers increased safely and security over existing methods and devices for temporarily mounting ladders on vehicle racks. The invention is especially applicable for use by commercial contractors, such as painters, roofers, and window washers.

For many commercial contractors, ladders are essential implements which must be loaded on a vehicle and transported between multiple job sites during the day. The contractor's vehicle typically includes an overhead or side-mounted ladder rack or canopy rack designed for carrying one or more ladders. Time and convenience are generally the primary concerns when securing the ladder to the vehicle rack. Some contractors use a combination of bungee cords, nylon straps, cables, and/or chains to tie the ladders directly to the rack. While these items are relatively inexpensive and often readily available, they are frequently applied in haste and with little attention paid to the working condition of the straps and cords. The result is that many ladders are transported on busy roads and highways in a generally unsafe condition. In addition, these items provide little if any protection against theft.

SUMMARY OF INVENTION

Therefore, it is an object of the invention to provide a clamp assembly which is especially applicable safely and conveniently securing a ladder to a vehicle rack.

It is another object of the invention to provide a clamp assembly which is applicable for securing double stacked ladders to a vehicle rack.

It is another object of the invention to provide a clamp assembly which is applicable to all types of ladders including extension and step ladders.

It is another object of the invention to provide a clamp assembly which is adjustable for attachment to all types of vehicle racks.

It is another object of the invention to provide a clamp assembly which protects against theft.

It is another object of the invention to provide a clamp assembly which can be quickly applied and removed in only a few seconds.

It is another object of the invention to provide a clamp assembly which is compact for convenient storage when not in use.

It is another object of the invention to provide a clamp assembly which is lightweight and durable.

It is another object of the invention to provide a clamp assembly which offers increased holding strength to secure the ladder to the vehicle in the event of a sudden stop or accident.

It is another object of the invention to provide a clamp assembly which substantially eliminates any sideways shifting of ladder during transport.

It is another object of the invention to provide a clamp assembly which has no protruding parts.

It is another object of the invention to provide a clamp assembly which has only a few component parts.

It is another object of the invention to provide a clamp assembly which is relatively inexpensive to manufacture.

It is another object of the invention to provide an improved method for securing a ladder to a vehicle rack.

These and other objects of the present invention are achieved in the preferred embodiments disclosed below by providing a clamp assembly for securing a first article to a second article. The clamp assembly includes first and second spaced-apart article holders adapted for engaging respective first and second articles. An elongated gear rack interconnects the first and second article holders. A pinion operatively engages the gear rack, and is adapted for moving the first article holder along the gear rack relative to the second article holder. A locking bar has a plurality of spaced teeth adapted for meshing with respective teeth of the gear rack in a locked position. Means are provided for moving the locking bar between the locked position and a released position. In the locked position, the meshing teeth of the locking bar and gear rack cooperate to prevent linear movement of the first article holder relative to the second article holder, thereby securing the first article to the second article. In the released position, the teeth of the locking bar and gear rack are sufficiently disengaged to allow free linear movement of the first article holder along the gear rack relative to the second article holder.

According to another preferred embodiment of the invention, a hand knob is adapted for rotating the pinion to move the first article holder relative to the second article holder.

According to another preferred embodiment of the invention, a gear housing is fixed to the first article holder, and defines a through channel for accommodating linear movement of the housing along a length of the gear rack.

According to another preferred embodiment of the invention, the gear housing includes biasing means for normally urging the locking bar into the locked position.

According to another preferred embodiment of the invention, a release arm is connected to the locking bar and adapted for being pulled against the force of the biasing means to disengage the locking bar from the locked position.

According to another preferred embodiment of the invention, the release arm and the gear housing define respective holes which align in the locked position to receive a locking member. The locking member operating to hold the locking bar in the locked position.

Preferably, the locking member is a padlock.

According to another preferred embodiment of the invention, the locking bar has more than 2 teeth.

According to another preferred embodiment of the invention, each of the first and second article holders comprises a generally U-shaped channel.

According to another preferred embodiment of the invention, each of the first and second article holders has a length dimension greater than two times its width dimension.

In another embodiment, the invention is the combination of a ladder rack and clamp assembly. The ladder rack is adapted for mounting on a vehicle. The clamp assembly secures a ladder to the ladder rack. The clamp assembly includes first and second spaced-apart holders adapted for engaging the ladder and the ladder rack, respectively. An elongated gear rack interconnects the first and second holders. A pinion operatively engages the gear rack, and is adapted for moving the first holder along the gear rack relative to the second holder. A locking bar has a plurality of spaced teeth adapted for meshing with respective teeth of the gear rack in a locked position. Means are provided for moving the locking bar between the locked position and a released position. In the locked position, the meshing teeth of the locking bar and gear rack cooperate to prevent linear movement of the first holder relative to the second holder, thereby securing the ladder to the ladder rack. In the released position, the teeth of the locking bar and gear rack are sufficiently disengaged to allow free linear movement of the first holder along the gear rack relative to the second holder.

In yet another embodiment, the invention is a method for securing a ladder to a vehicle ladder rack. The method includes the steps of placing the ladder on the vehicle ladder rack such that a rung of the ladder is located adjacent a lateral crossbar of the vehicle ladder rack. A first generally U-shaped holder of a clamp assembly is then applied to the rung of the ladder, while a second generally U-shaped holder is applied to the lateral crossbar of the vehicle ladder rack. The first and second holders of the clamp assembly are then brought together into a locked position to secure the ladder to the ladder rack.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
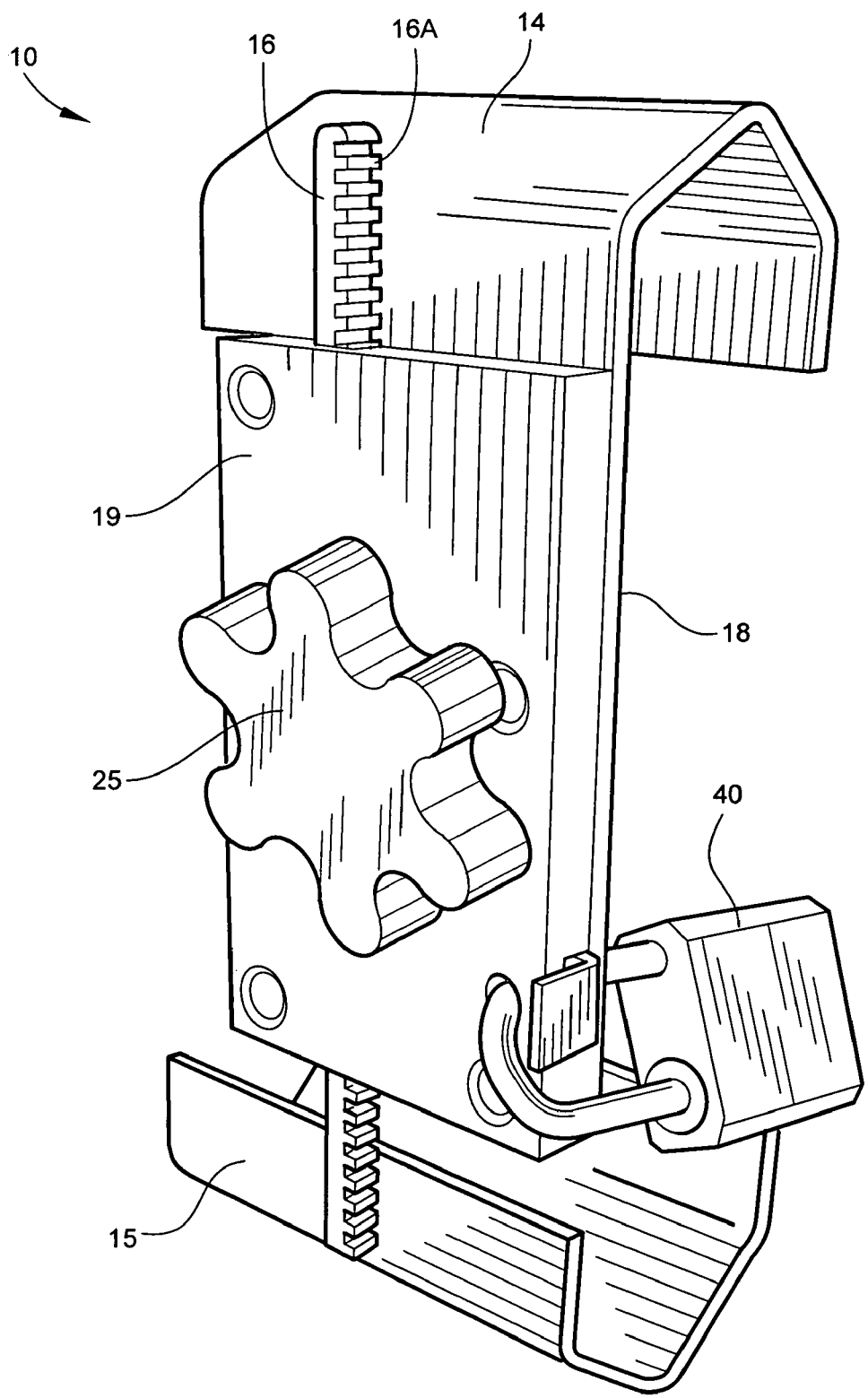
FIG. 1 is a perspective view of the clamp assembly according to one preferred embodiment of the present invention.
Figure 2:
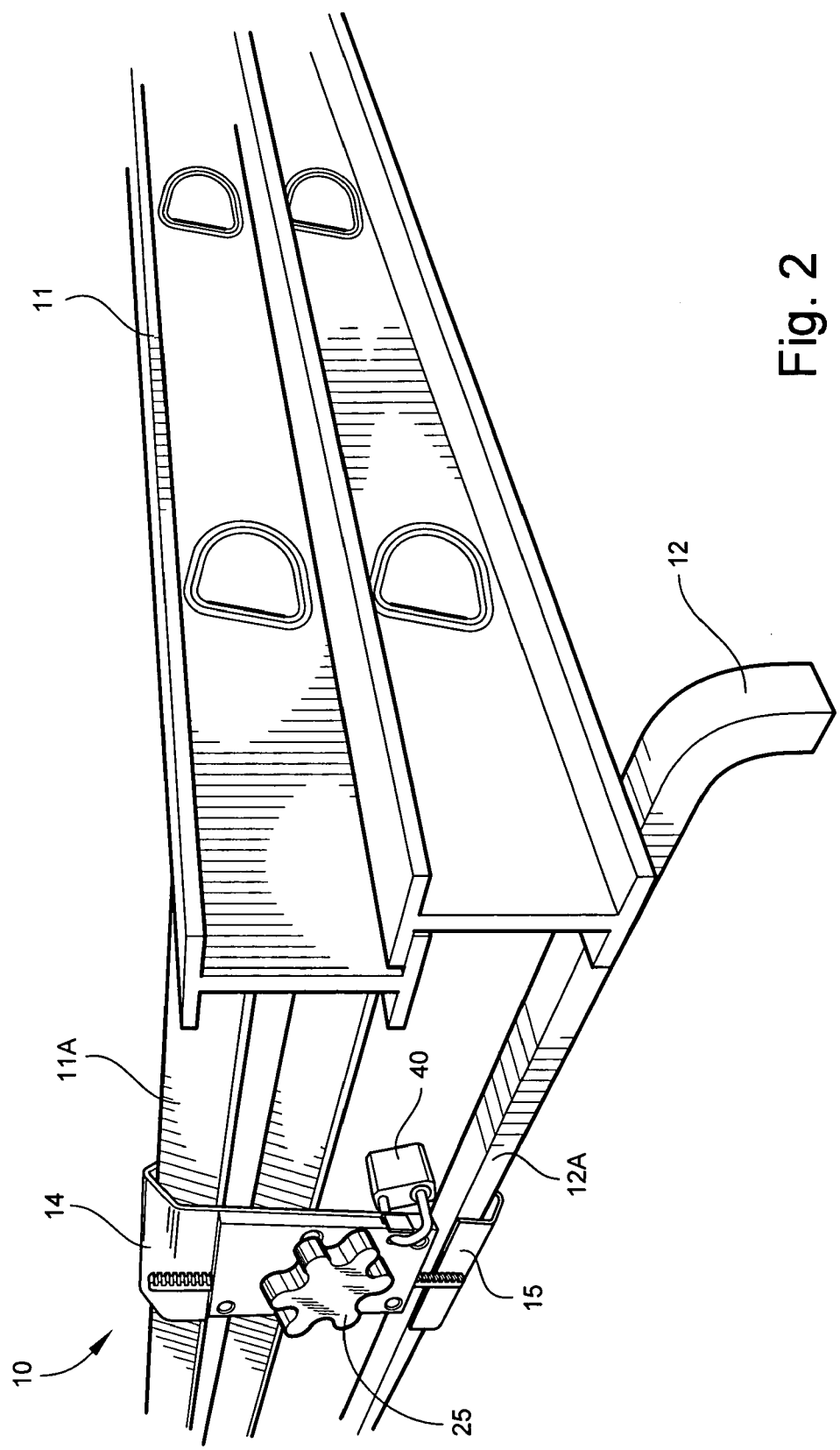
FIG. 2 is an environmental view of the clamp assembly applied to a ladder carried on a conventional vehicle rack.

Referring now specifically to the drawings, a clamp assembly according to the present invention is illustrated in FIG. 1, and shown generally at reference numeral 10. The clamp assembly 10 is especially applicable for securing and locking a ladder 11 or other loose article to a vehicle rack 12, as shown in FIG. 2. Preferably, each ladder 11 carried on the vehicle rack 12 is secured by two or more spaced-apart clamp assemblies 10, as described below. The clamp assemblies 10 may also be used for securing a second ladder (not shown) to the first ladder 11 in a stacked condition.

Figure 3:
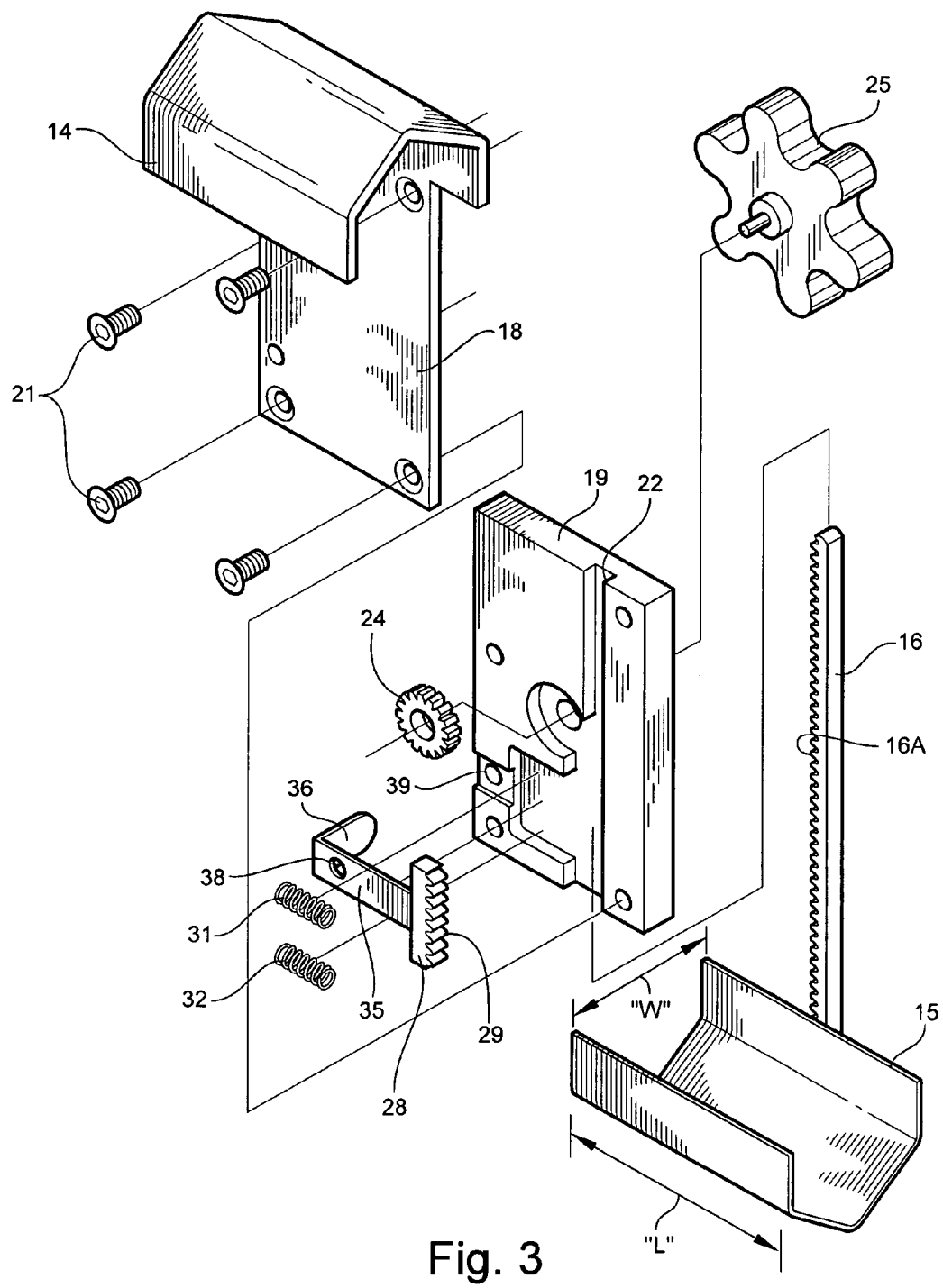
FIG. 3 is an exploded view of the clamp assembly.

Referring to FIGS. 1, 2, and 3, the clamp assembly 10 includes first and second cooperating holders 14 and 15 interconnected by an elongated gear rack 16, and designed for closely engaging a rung 11A of the ladder 11 and crossbar 12A of the vehicle rack 12, respectively. As best shown in FIG. 3, the first holder 14 is integrally formed with the cover plate 18 of a gear housing 19. The cover plate 18 and gear housing 19 are attached together by threaded bolts 21, or other suitable means. When assembled, the cover plate 18 and housing 19 define a closed through-channel 22 for receiving a free end of the gear rack 16. A pinion 24 is rotatably mounted inside the gear housing 19, and positioned to operatively engage the teeth 16A of the gear rack 16. The second holder 15 is permanently fixed to a proximal end of the gear rack 16. A convenient hand knob 25 operates to rotate the pinion 24 along the length of the gear rack 16, thereby effecting linear movement of the first holder 14 and attached gear housing 19 relative to the second holder 15.

Figure 4:
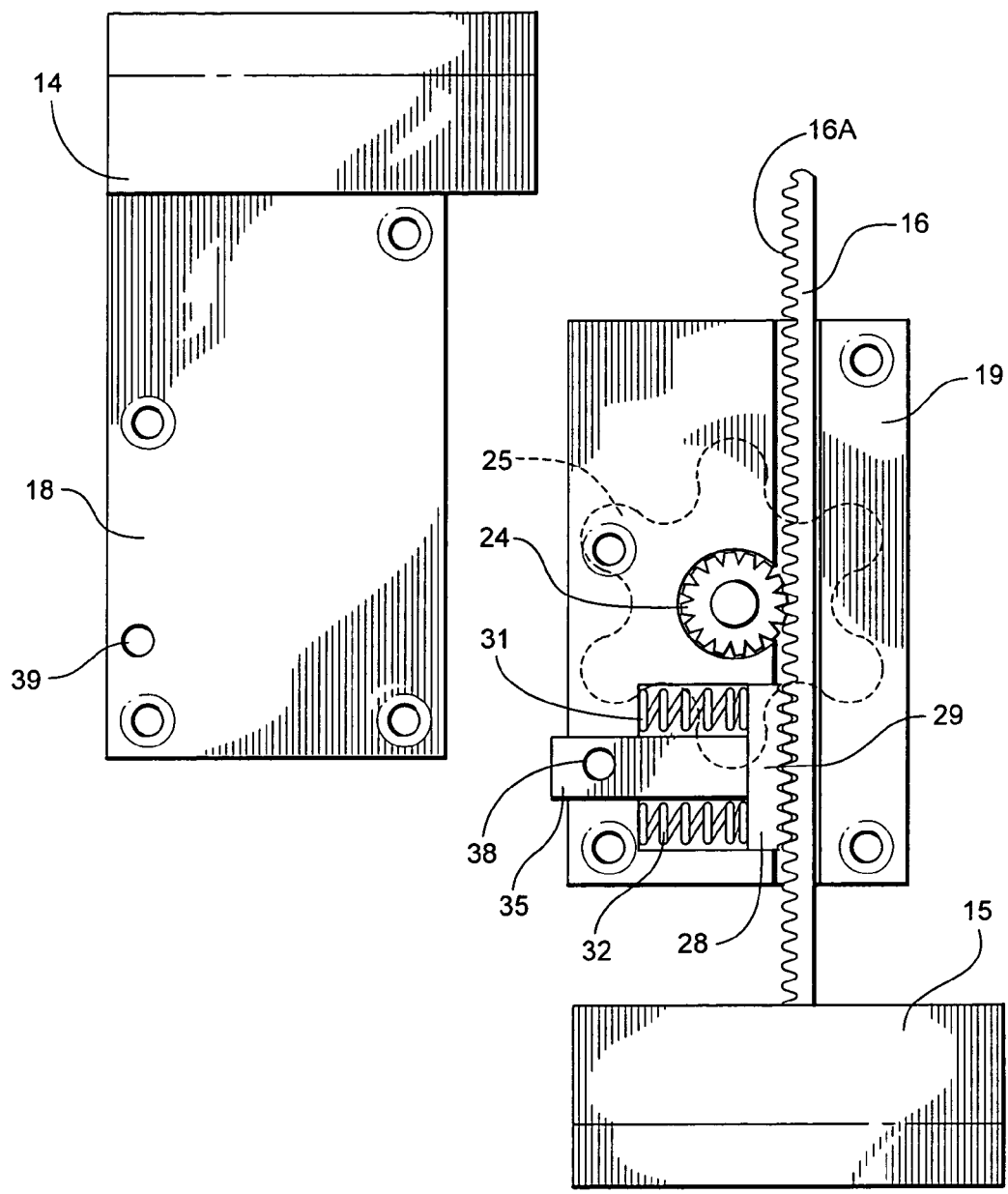
FIG. 4 is a front view of the clamp assembly with the first holder removed from the gear rack, and showing the locking bar in the locked position.
Figure 5:
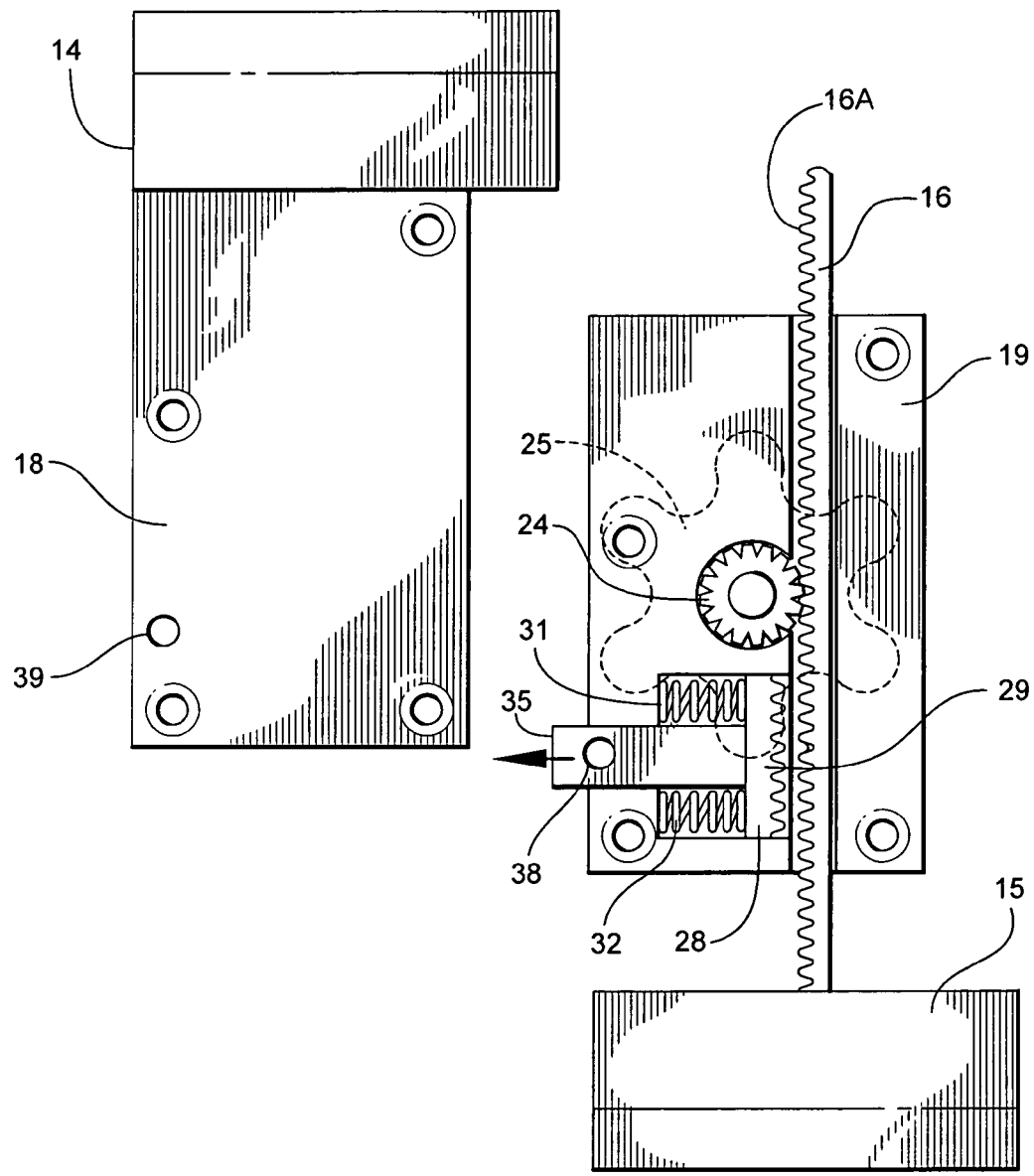
FIG. 5 is a front view of the clamp assembly with the first holder removed from the gear rack, and showing the locking bar in the released position.
Figure 6:
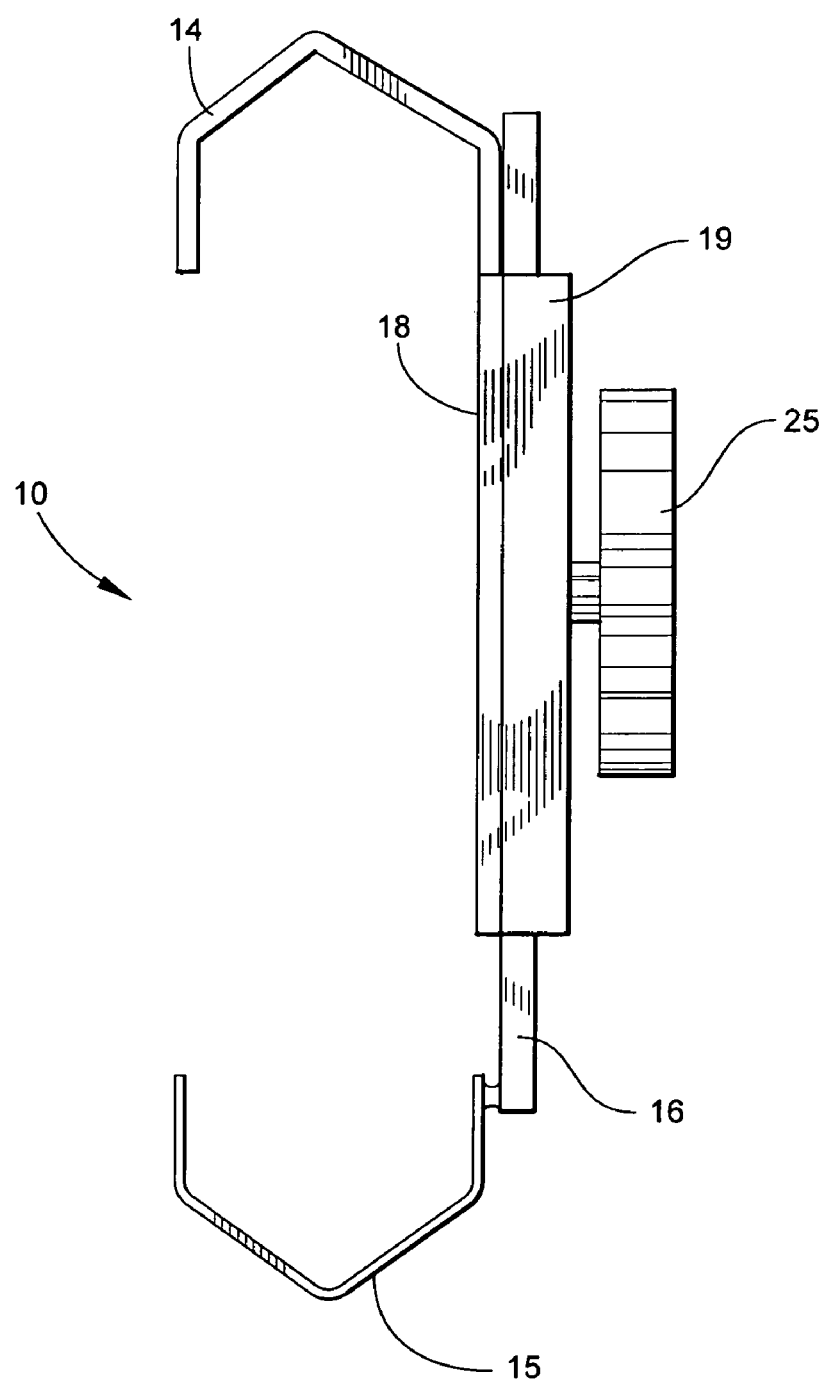
FIG. 6 is a side view of the clamp assembly.

As shown in FIGS. 3, 4, and 5, a locking bar 28 is located inside the gear housing 19 and includes a plurality of integrally-formed teeth 29 adapted for meshing with the teeth 16A of the gear rack 16 in a locked position. Preferably, the locking bar 28 includes between 5 and 10 spaced teeth 29. Biasing means, such as compression springs 31 and 32, engage the locking bar 28 and normally urge the teeth 29 into meshing engagement with the gear rack 16, thereby preventing linear movement of the first holder 14 relative to the second holder 15. In the locked position shown in FIG. 4, the meshed teeth of the locking bar 28 and gear rack 16 provide substantial resistance against shearing, such that the cooperating holders 14 and 15 remain clamped to the ladder 11 and vehicle rack 12 to safely secure the ladder 11 in the event of a sudden stop or collision.

A release arm 35 is connected to the locking bar 28, and has a perpendicularly disposed finger 36 designed for being pulled against the biasing force of the compression springs 31, 32 to temporarily disengage the teeth 29 and 16A of the locking bar 28 and gear rack 16. In the released position shown in FIG. 5, the first holder 14 can freely move inwardly or outwardly relative to the second holder 15 in order to secure or release the ladder 11. Respective holes 38 and 39 formed through the release arm 35 and gear housing 19 align in the locked position to receive a locking member, such as a pad lock 40 shown in FIGS. 1 and 2. The pad lock 40 holds the locking bar 28 in the locked position such that the ladder 11 cannot be removed from the vehicle rack 12 without first removing the lock 40. In alternative embodiments, the locking member may comprise a cotter pin, combination lock, or other means suitable for fixing the position of the locking bar 28 relative to the gear rack 16.

Figure 7:
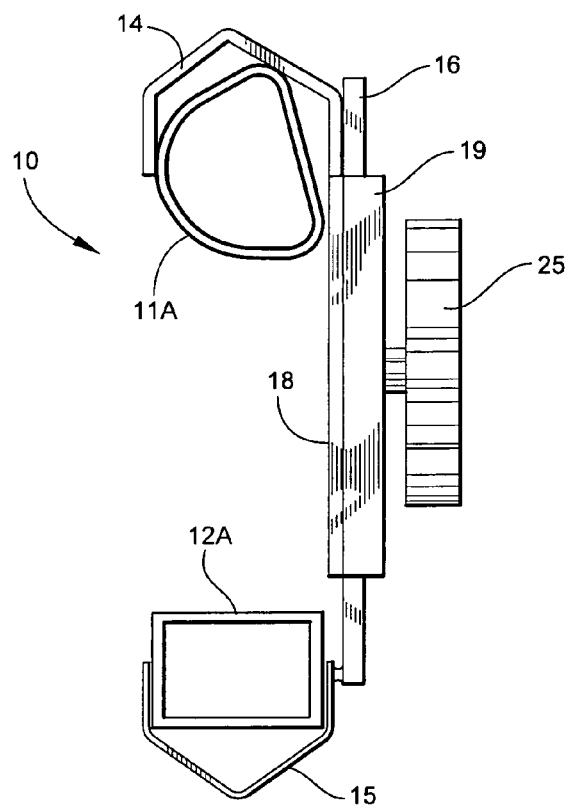
FIG. 7 is a side view of the clamp assembly showing the first and second holders applied to the ladder rung and rack crossbar, respectively.
Figure 8:
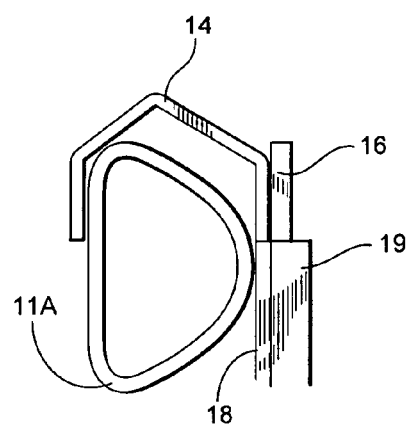
FIG. 8 is a fragmentary view of the clamp assembly showing the first holder applied to the ladder rung in an alternative orientation.
Figure 9:
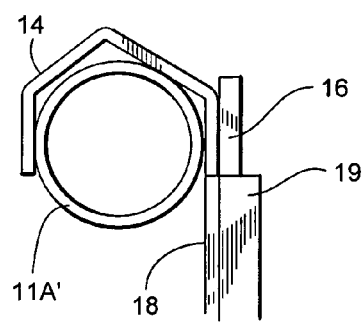
FIG. 9 is a fragmentary view of the clamp assembly showing the first holder applied to a round-section ladder rung.

Referring to FIGS. 6–9, the holders 14 and 15 preferably comprise generally U-shaped channels designed to accommodate multiple rung and rack cross-sections. FIG. 7 shows the clamp assembly 10 applied to a conventional ladder rung 11A and rack crossbar 12A. FIG. 8 shows the holder 14 applied to the ladder rung 11A in an alternative orientation. FIG. 9 shows the holder 14 applied to a round-section ladder rung 11A'. For increased holding strength, the length "L" of each holder 14, 15, as shown in FIG. 4, is substantially greater that its width "W", and is preferably greater than 3 times its width. According to one embodiment, the length of each holder is approximately 3 inches and the width approximately 1.5 inches. The height of the clamp assembly when fully extended is approximately 9 inches. The major components of the clamp assembly 10 are preferably formed of a lightweight, durable plastic, such as ABS, PVC, or a polycarbonate, such as Lexan®.

Securing the Ladder 11 to the Vehicle Rack 12

The ladder 11 is secured to the vehicle rack 12, as shown in FIG. 2, by first placing the ladder 11 on top of the rack 12 such that the rungs 11A locate near at least two spaced crossbars 12A of the rack 12. The rack crossbars 12A extend laterally from one side of the vehicle, and are typically spaced apart about 4–6 feet. The clamp assembly 10 is opened by moving the locking bar 28 into the released position, as previously described, and then rotating the hand knob 25 to spread the holders 14 and 15. The holders 14, 15 are then applied, respectively, to a selected rung 11A of the ladder 11 and a selected crossbar 12A of the vehicle rack 12. With the locking bar 28 still in the released position, the hand knob 25 is rotated in an opposite direction moving the first holder 14 inwardly towards the second holder 15 to tightly clamp the ladder 11 and rack 12 together. At this point the locking bar 28 moves back into the locked position preventing linear movement of the holders 14, 15. A second clamp assembly 10 is then applied in an identical manner to another ladder rung 11A and a second crossbar 12A of the vehicle rack 12. A pad lock 40 is then fed through the aligned holes 38 and 39 in the release arm 25 and gear housing 19 of each clamp assembly 10 to secure and lock the ladder 11 to the rack 12. The above process is completed in a matter of seconds. The ladder 11 is removed from the vehicle rack 12 by reversing this process.

A clamp assembly and method for securing a ladder to a vehicle rack are described above. Various details of the invention may be changed without departing from its scope. Furthermore, the foregoing description of the preferred embodiment of the invention and best mode for practicing the invention are provided for the purpose of illustration only and not for the purpose of limitation—the invention being defined by the claims.

We claim:

1. In combination with a ladder rack adapted for mounting on a vehicle, a clamp assembly for securing a ladder to said ladder rack, said clamp assembly comprising:
   first and second spaced-apart holders adapted for engaging the ladder and said ladder rack, respectively;
   an elongated gear rack interconnecting said first and second holders;
   a pinion operatively engaging said gear rack, and comprising a plurality of uniformly spaced teeth formed along an entire circumference of said pinion;
   a hand knob rotatable about a notional axis extending centrally through said pinion, and adapted for rotating said pinion to thereby move said first article holder along said gear rack relative to said second article holder;
   a locking bar comprising a plurality of spaced teeth adapted for meshing with respective teeth of said gear rack in a locked position; and
   means for moving said locking bar between the locked position and a released position, such that:
      (i) in the locked position, the meshing teeth of said locking bar and gear rack cooperate to prevent linear movement of said first holder relative to said second holder, thereby securing the ladder to said ladder rack; and
      (ii) in the released position, the teeth of said locking bar and gear rack are sufficiently disengaged to allow free linear movement of the first holder along said gear rack relative to the second holder.

2. A combination according to claim 1, and comprising a hand knob adapted for rotating said pinion to move said first holder relative to said second holder.

3. A combination according to claim 1, wherein said locking bar comprises more than 2 teeth.

4. A combination according to claim 1, wherein each of said first and second article holders comprises a generally U-shaped channel.

5. A combination according to claim 1, and comprising a gear housing fixed to said first holder, and defining a through channel for accommodating linear movement of said housing along a length of said gear rack.

6. A combination according to claim 5, wherein said gear housing comprises biasing means for normally urging said locking bar into the locked position.

7. A combination according to claim 6, and comprising a release arm connected to said locking bar and adapted for being pulled against the force of said biasing means to disengage said locking bar from the locked position.

8. A combination according to claim 7, wherein said release arm and said gear housing define respective holes which align in the locked position to receive a locking member, said locking member operating to hold said locking bar in the locked position.

9. A combination according to claim 8, wherein said locking member comprises a padlock.

* * * * *